US005529422A

United States Patent [19]

Ligertwood

[11] Patent Number: 5,529,422
[45] Date of Patent: Jun. 25, 1996

[54] COUPLING FOR A MODULAR CONSTRUCTION SYSTEM

[76] Inventor: Peter Ligertwood, Unicol Engineering, Green Road, Headington, Oxford, Great Britain, OX3 8EU

[21] Appl. No.: 178,303

[22] PCT Filed: Jul. 9, 1992

[86] PCT No.: PCT/GB92/01254

§ 371 Date: Jan. 6, 1994

§ 102(e) Date: Jan. 6, 1994

[87] PCT Pub. No.: WO93/01419

PCT Pub. Date: Jan. 21, 1993

[30] Foreign Application Priority Data

Jul. 9, 1991 [GB] United Kingdom ............ 9114798

[51] Int. Cl.$^6$ .................. F16B 7/00; E04B 1/58; E04G 7/06
[52] U.S. Cl. .............. 403/170; 403/217; 403/271; 403/169
[58] Field of Search ............... 52/655.1, 655.2, 52/DIG. 10, 81.3, 646; 403/169, 170, 171, 175, 176, 184, 182, 181, 180, 217, 270, 271, 362; 285/286

[56] References Cited

U.S. PATENT DOCUMENTS

| 456,527 | 7/1891 | Walmsley ............ 403/23 X |
|---|---|---|
| 2,212,455 | 8/1940 | Reed ............ 403/170 X |
| 3,356,394 | 12/1967 | Chamayou . |
| 3,797,947 | 3/1974 | Foote ............ 403/23 |
| 4,473,986 | 10/1984 | Zeigler . |
| 4,579,273 | 4/1986 | Dahmen et al. ............ 285/286 X |
| 4,761,929 | 8/1988 | Zeigler . |
| 4,907,907 | 3/1990 | Kreusel . |

FOREIGN PATENT DOCUMENTS

| 87491/82 | 3/1983 | Australia . |
|---|---|---|
| 846381 | 9/1939 | France . |
| 2564911 | 11/1985 | France ............ 403/171 |
| 1282279 | 11/1968 | Germany . |
| 3400546 | 7/1984 | Germany . |
| 3634636 | 5/1987 | Germany . |
| 3721092 | 2/1988 | Germany . |
| 22895 | 1/1936 | United Kingdom ............ 403/176 |

*Primary Examiner*—Anthony Knight
*Attorney, Agent, or Firm*—Davies, Bujold & Streck

[57] ABSTRACT

A coupling for a modular construction system whereby a tubular element is linked to another element, or is supported, characterised by: 1) at least one cup-shaped unit (P, 22, 41, 61, 81, 102) having an open end (16) and a reduced end (12); the open end (16) serving to received an end (E) of a tubular element (T) to enable the end (E) to be pushed to a rest position (18) at the reduced end (12) of the cup-shaped Unit (P), and locking means (30) enabling a tubular element end (E) to be retained against further movement relative to the cup-shaped unit (P); the length (L') of the unit (P) being between one and one half and twice the outside diameter (D) of the tubular element (or of the major transverse dimension of the tubular element if it is of non-circular cross-section); and an aperture (13) at the reduced end (12) of the cup-shaped unit which is no more than one-half the maximum interior diameter (I) or maximum interior dimension of the cup-shaped unit (P); 2) the or each cup-shaped unit (P, 22, 41, 61, 81, 102) being linked to either: (i) a tube unit (43) adapted to enable a tubular element (T') to extend at least part way through the tube unit (43); or (ii) a block unit (83) adapted to align longitudinal axis (81') of cup-shaped unit (81) with a corresponding axis (84', 82') of at least one other tube unit (80) or further cup-shaped unit (82).

10 Claims, 7 Drawing Sheets

5,529,422

COUPLING FOR A MODULAR CONSTRUCTION SYSTEM

TECHNICAL FIELD

This invention relates to a coupling for a modular construction system and a method for fabricating it.

BACKGROUND ART

A known modular construction system makes use of galvanised malleable iron fittings used to clamp intermediate parts and ends of tubes of heavy gauge water pipe. While the fittings are robust they are not visually attractive. They are also limited to tubes of nominal outside diameter which are not available in lighter gauges. The overall weight of a structure created by way of malleable iron fittings and water pipe is substantial as against one of similar size making use of thin walled tubing. The water pipe used with the malleable fittings is not suitable for certain finishes (such as chrome plate) and is not readily available in material such as stainless steel. This is a disadvantage as use of sheet and other forms of reflecting and/or bright finish material such as chromium plate and stainless steel tube are frequently used in connection with exhibition, display, and other visually significant applications where appearance is of major importance. In addition the peripheral clearance left between the end of a pipe and a fitting into which the tube passes is frequently not uniform so showing a degree of visual incongruity which can be unattractive, if not unacceptable, in a display situation.

In what follows reference is made to a coupling intended for use with circular section tubing. However tubing of other section shape can readily be used with couplings having cups of suitable complementary cross section able to receive the other section tubing. Consequently in what follows reference is made to outside diameter in relation to round section tubes and to major transverse dimension in relation to tubes of non-circular section.

DISCLOSURE OF INVENTION

According to a first aspect of the present invention there is provided a coupling, for a modular construction system, whereby a tubular element is linked to another element, or is supported, characterised by:

1. at least one cup-shaped unit (P, 22, 41, 61, 81, 102) having an open end (16) and a reduced end (12); the open end (16) serving to receive an end (E) of a tubular element (T) to enable the end (E) to be pushed to a rest position (18) at the reduced end (12) of the cup-shaped unit (P), and locking means (30) enabling the tubular element (T) to be retained against further movement relative to the cup-shaped unit (P); the length (L') of the unit (P) being between one and one half and twice the outside diameter (D) of the tubular element (or of the major transverse dimension of the tubular element if it is of non-circular cross-section); and an aperture (13) at the reduced end (12) of the cup-shaped unit which is no more than one-half the maximum interior diameter (I) or maximum interior dimension of the cup-shaped unit (P);

2. the or each cup-shaped unit (P, 22, 41, 61, 81, 102) being linked to either:

(i) a tube unit (43) adapted to enable a tubular element (T') to extend at least part way through the tube unit (43); or (ii) a block unit (83) adapted to align longitudinal axis (81') of cup-shaped unit (81) with a corresponding axis (84',82') of at least one other tube unit (80) or further cup-shaped unit (82).

According to a first preferred version of the first aspect of the present invention there is provided a coupling as claimed in claim 1 characterised in that the locking means is a screw (30) adapted to be driven into frictional engagement with a tube end (E) of a tubular element (T) located in the cup-shaped unit, or a shear member adapted to be driven into positive engagement with a tubular element located in the cup-shaped unit (22, 41, 61, 81, 102).

According to a second preferred version of the present invention there is provided a coupling according to the first aspect or the first preferred version thereof characterised by a block unit (24,83), to which at least one cup-shaped unit (23,81) is coupled, connected to a further cup-shaped unit (22) or to a tube unit (84) by way of a pivot (C, 88) to enable angular alignment of the longitudinal axis (26,81') of the cup-shaped unit (23,81) to be varied relative to and secured in any one of at least two positions relative to the further cup-shaped unit (22,82) or tube unit (84).

According to a third preferred version of the first aspect of the present invention or any preceding preferred version thereof there is provided a coupling characterised in that the open end of each cup-shaped unit (22) has a periphery shrouded by a skirt (C) of flexible material which serves to conceal any misalignment between longitudinal axis (25) of the cup-shaped unit (22) and a centre of symmetry (U) on a tubular member (T).

According to a fourth preferred version of the first aspect of the present invention the a coupling according to the third preferred version is characterised in that the skirt (C) serves to retain and/or conceal the locking means (30).

According to a second aspect of the present invention there is provided a method of manufacturing a coupling according to the first aspect or any preferred version thereof characterised in that the or each cup-shaped unit (P) is fabricated by:

1. providing a section of pipe having an interior diameter (I), or major interior dimension, slightly larger than an outer diameter (D), or the major outside dimension, of a tubular element (T) to be used with the system;

2. deforming one end of the section to provide a cup-shaped end (12) to the length having:

i such that the inner diameter (I), or major interior dimension, of the pipe length at or near the cup-shaped end (12) is less than that of an outer diameter (D) of a tubular element (T) so as to limit travel of tubular element (T) into the deformed pipe length;

ii the deformed pipe having a length (L') being between one and one half and twice the interior diameter (D) or major interior dimension; and iii an aperture (13) at the one end (12) which is no more than three-quarters the interior diameter (I) of the undeformed section;

3. mounting a tubular element retaining means (30 FIG. 3) on the cup-shaped unit; and 4. securing the apertured end (12) to the tube unit (43) or the block unit (24).

According to a first preferred version of the second aspect of the present invention the method is characterised by two cup-shaped units (22, 23) are assembled by:

1. securing the one end of one cup-shaped unit (22) to a first part (24A) of a block unit;

2. securing the one end of the other cup-shaped unit (23) to a second part (24B) of a block unit; and 3. linking the first part of the block unit (24A) to the second (24B) so that the longitudinal axis (25, 26) of each cup-shaped unit (22, 23), extended if necessary, intersects with alignment axis (27) at substantially the same point.

According to a second preferred version of the second aspect of the present invention or the first preferred version thereof the method is characterised in that the step of linking the first (24A) and second (24B) parts of a block unit (24) is by way of a pivot (C) so that the longitudinal axis (25) of one cup-shaped unit (23) can be displaced about the alignment axis (C) relative to the other cup-shaped unit (22) and then be clamped with a selected angular displacement between the longitudinal axes (25, 26).

According to a third preferred version of the second aspect of the present invention the method of the second preferred version is characterised in that the step of securing the one end of each cup-shaped unit (P) includes an initial operation of profiling the deformed end (12) of each cup-shaped unit so that the profile complements the region of the tube unit (43 FIG. 3) or block unit (24 FIG. 2) to which it is to be attached; and a joining operation involving a welding or material deposition or displacement which operation is undertaken from within the cup-shaped member (P) by way of the aperture (13) so as to limit the ejection of displaced material in an external region of the coupling adjacent juxtaposed regions of the cup-shaped member (12) and the tube unit (43) or block unit (34).

According to a third aspect of the present invention there is provided a structure characterised in that it is assembled by way of a coupling according to the first aspect.

It will be apparent that a large number of coupling units can be created or manufactured in accordance with the present invention to enable a wide range of display, exhibition and guidance arrangements to be assembled. The invention is particularly concerned with a visually attractive construction system which can be readily assembled and dis-assembled. To this end couplings according to the invention have been manufactured from mild steel and powder coated for use with tubular elements of chromium plated thin walled mild steel 2 inch diameter pipe.

BRIEF DESCRIPTION OF DRAWINGS

Exemplary embodiments of the invention will now be described with reference to the accompanying drawings of a component and three embodiments of a coupling for a modular construction system of which.

MODES FOR CARRYING OUT THE INVENTION

FIG. 1

Figure 1:
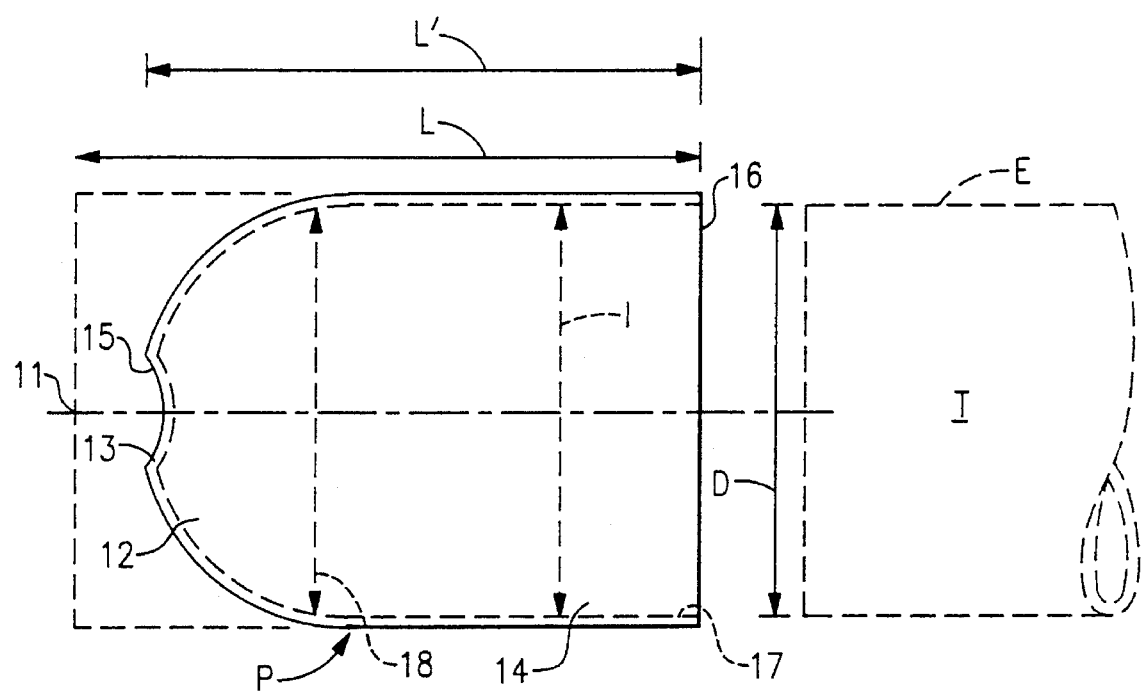
FIG. 1 is a plan view of a component.

FIG. 1 shows a cup shaped component 14 which is the basic component of the three elements described in relation to FIG. 2 to 7. The finished component is of length L' and inside diameter I and is shown in full outline. It is formed from a cut length of rolled mild steel tube of initial length L (the left hand end before forming is shown in broken outline 11 ). The substantially hemispherical left hand end 12 is formed by a hydraulic pressing operation so as to leave a central aperture 13. The aperture 13 provides for the completed cup 14 to be secured to a tube unit or block unit as will be described hereafter with reference to FIGS. 2 to 7.

Apart from the aperture 13 the left hand end 12 is provided with a curved recess 15 which provides for the left hand end 12 to be mated with a complementarily curved surface on a tube or block unit so avoiding a visually unattractive gap to appear between the cup 14 and the tube or block unit to which it is welded.

Joining is carried out by a welding process from within cup 14. The cup is juxtaposed with the remainder of the coupling with recess 15 seating on the curved surface of a tube or block unit. A welding rod or torch is then inserted into open end 16 of the cup and the perimeter of the aperture 13 including the recess 15 is welded to the tube or block unit to which it is to be connected. Various possible configurations are described hereafter in connection with FIGS. 2 to 7. By welding the cup 14 in this way from the inside the amount of displaced weld material appearing on the outside of the coupling is minimised so providing a well finished appearance able to take any one of a number of finish coatings or deposits without the need for a hand or mechanical fettling step.

Open end 16 of the cup is left at its original internal diameter (I) to receive an end (E) of thin wall tube T (shown in chain dotted outline). The tube end can pass along interior bore 17 of the tube until it abuts the start 18 of reduced internal bore at the inner end of the cup 14. In view of the accurate forming technique for the cup the length of the tube T that can be retained in the cup is substantially identical for all cups. It serves to retain sufficient length of pipe for structural use while ensuring that the end section of tube T will buckle in the event the tube is overloaded. In the event that the cup 14 provides for an excessive length of support it is possible that an overload would cause failure of the joint between the cup 14 and a tube or block unit to which it is welded with the transmission of the effect structural failure into all the elements to which the coupling is connected. Such a potentially catastrophic failure is clearly undesirable and by using cup units 14 of specific depth the effects of overloading can be localised. This is most desirable in exhibition or other temporary display locations where assembly of a structure is likely to be undertaken by inexperienced users.

The tube used in the construction system of this exemplary embodiment is a thin walled rolled mild-steel tubing of 2 inches outside diameter.

Figure 2:
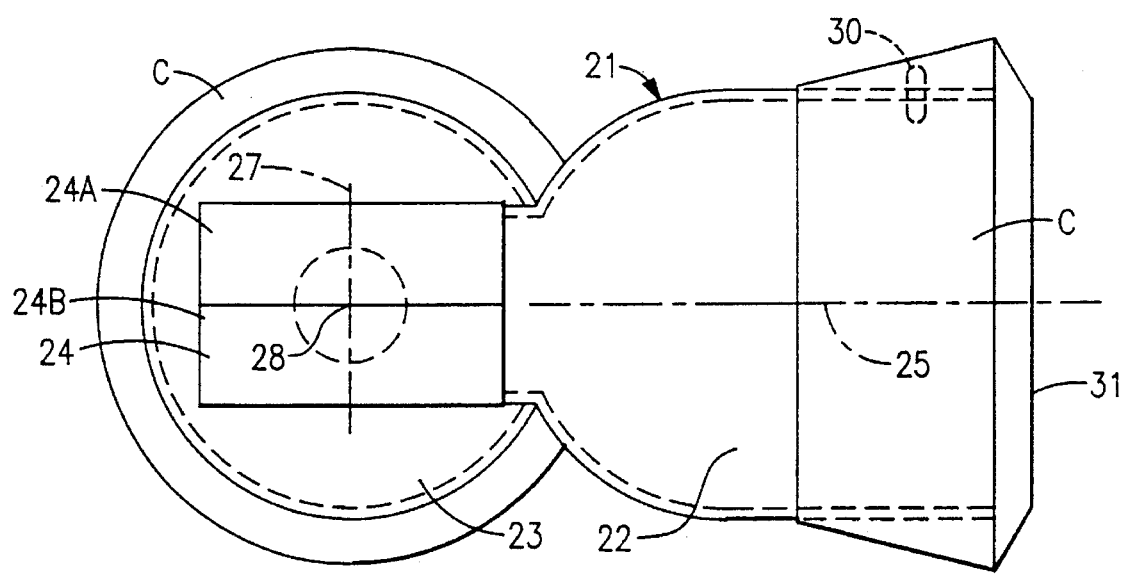
FIG. 2 is a side view.
Figure 3:
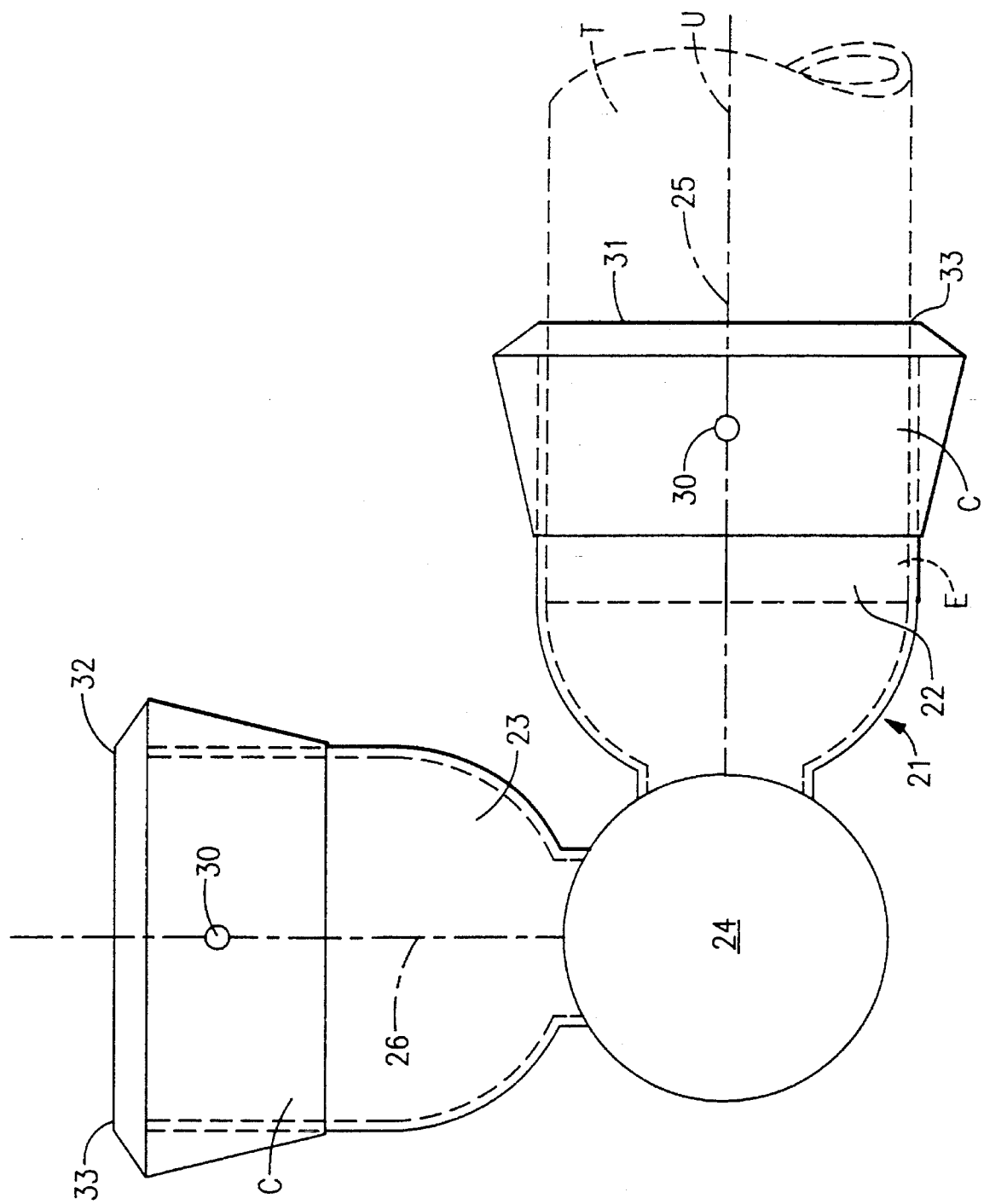
FIG. 3 is a plan view of a first embodiment.

FIGS. 2 and 3

This shows a right angled coupling 21 having a first cup 22 and a second cup 23 identical to that described in connection with FIG. 1 joined to one another by way a block 24. Cup 22 has a longitudinal axis of symmetry 25 and cup 23 has a corresponding axis 26. The block 24 has a vertical axis 27.

In fabricating the coupling 21 the cups 22, 23 are presented to the block 24 and welded to it so that axis 25 is at right angles to axis 26 and both intersect vertical axis 27 of the block at right angles and at the same point 28. By welding in a controlled manner from the inside of each cup 22, 23 a minimum amount of displaced weld material appears in visually significant parts of the coupling. The completed coupling 21 is then finished by a powder coating process.

Each cup 22, 23 has a threaded bore through its side wall near the open end of each cup-member in which a grub screw 30 is located to enable a tube end E referred to in connection with FIG. 1 to be inserted into the open ends 31, 32 of, respectively, cups 22, 23 and then locked in place by tightening up the grub screws 30. To ensure that a tube is readily inserted into a cup the inside diameter I of the open end of the cup is some 1 mm greater than the external diameter D of the tube. On tightening the grub screw this causes a non-uniform gap to appear between the tube and the cup in which it is clamped. To overcome this visual anomaly plastic end covers C is located over the open end of the coupling. Internal lip 33 of cover C shrouds the open end 31, 32 of each cup and abuts the tube to provide a neatly finished appearance.

The main body portion of the cover C is provided with a piercing which serves to retain grub screw 30. In the course of assembling or disassembling a structure making use of the couplings grub screw 30 is retained in place by frictional contact with the cover C, whether screwed in or out, where it will be needed. This is of benefit when a user has to steady themselves and/or structural elements while on a partially assembled or dis-assembled structure and tighten, or loosen, a grub screw 30. The cover C in this case is pierced to provide ready access to the grub screw. If a secret fixing is preferred where the outer end of the grub screw is covered by the cover rather than revealed through it then the opening in the cover for the screw is omitted. The cover is held clear of the grub screw which is thereafter tightened up. The cover is then located to cover the grub screw.

The cover C in its unmounted condition as an isolated component has a lip 33 which is elliptical in shape with the widest axis extending across the ellipse to pass through the aperture in the cap including the grub screw. To enable the cover to be located correctly on the end of a cup-shaped member or a tube unit during assembly a locating mark is moulded onto the cup so that both by sight and by touch it is possible for a user to locate the widest 'diameter' of the cover. Once the cover is in place on a cup-shaped unit and a tube inserted the lip 33 of the cover distorts to abut the periphery of the tube. Tightening up of the grub screw causes the tube end within the cup-shaped member to be displaced laterally causing the opposite side of the tube end to abut an inner wall of the cup so giving rise to a crescent shaped gap between them. The lip 33 is also displaced so as to completely mask the gap giving a finished appearance to the juxtaposed parts of the coupling and the tube end. Furthermore in addition to providing a retainer for the grub screw and a shroud of the gap between coupling and tube the cover also serves to provided protection for the end of the coupling when it is lying unused with other items. It will be seen from a cursory inspection of the accompanying figures of the various embodiments that covers are located at the outer extremities of the various forms of coupling. Thus if several of the couplings are lying loosely in a container and are caused to move relative to one another the covers will serve to protect the extremities of a coupling against the effect of impact with another and in particular protect the coated body portions of the coupling from cosmetic damage.

The block 24 in this case is a single entity. However it is also envisaged that the block 24 can be in two separate parts 24A, 24B. Part 24 A is welded to cup 22 and part 24B to cup 23. The parts 24A, 24B are then coupled to one another by way of a pivot clamp located on axis 27 to enable the parts 24A, 24B to be rotated about axis 27 and then clamped when the axis 25, 26 while both being perpendicular to axis 27 can be clamped at a selected angle. Such a coupling provides for the setting of tubular members at any angle relative to other elements in a structure.

Figure 4:
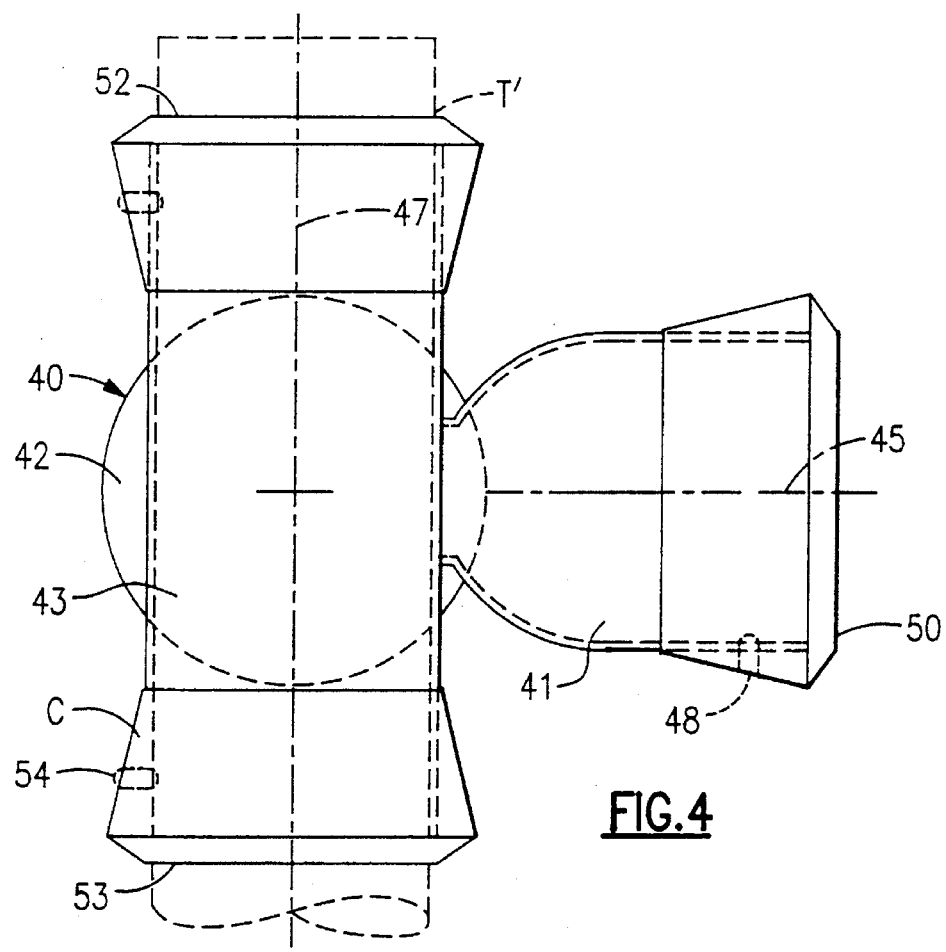
FIG. 4 is a side view.
Figure 5:
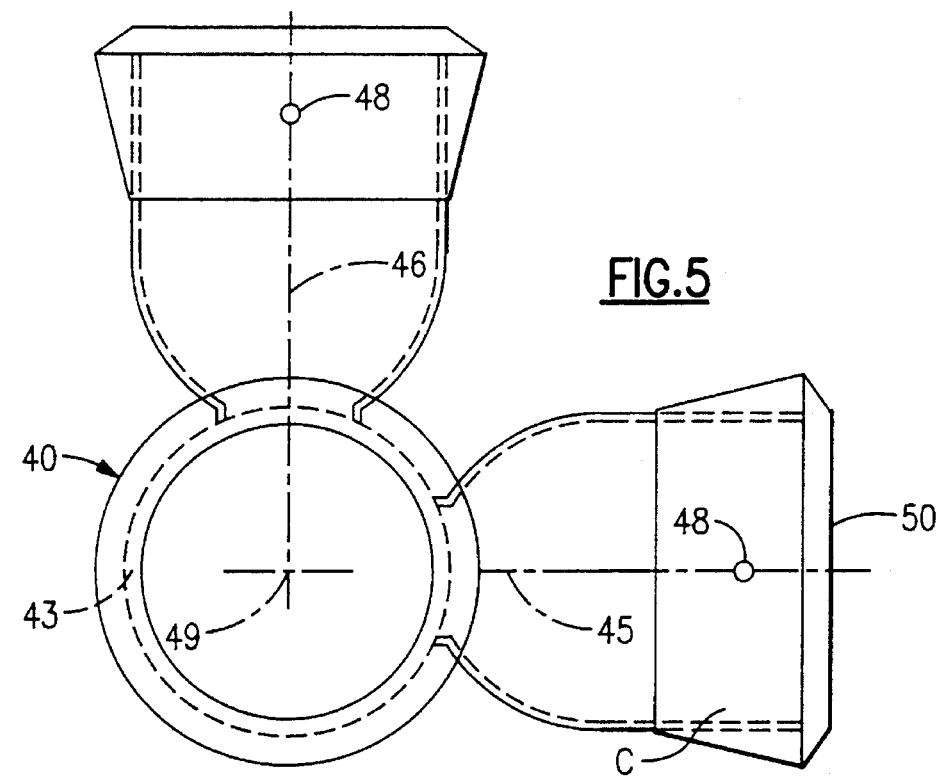
FIG. 5 is a plan view of a second embodiment.

FIGS. 4 and 5

In this case coupling 40 is made up of two cups 41, 42 identical to those described earlier. The cups 41, 42 are in this case linked to a tube unit 43 which has an axis 47 on which axis 45 of cup 41 and axis 46 of cup 42 intersect at point 49. Each cup 41, 42 has a threaded bore through the cup wall in which a grub screw 48 is located to enable tube ends of the type T referred to in connection with FIG. 1 to be inserted into open ends 50, 51 of, respectively, cups 41, 42 and then locked in place by tightening up the grub screws 48.

The tube unit 43 is of uniform internal bore to receive a tube T' (shown in broken outline) which extends through the body of the unit 43. In this case the tube unit 43 is open ended to enable the coupling to be located at any point along the length of the tube T'. In this case ends 52, 53 of the tube unit 43 (and open ends 50, 51 of cups 41, 42) are shrouded by end covers C described earlier.

The tube unit 43 has a threaded bore for locating a grub screw 54 of similar form and function to screws 48 mounted in each cup 41, 42. For situations where the tube unit 43 is located on a vertical tube at a position intermediate the end of the tube it may be necessary (for example in view of the load fed to the tube unit 43 by way of horizontal tubes which it supports through cup-shaped members 41, 42) to secure the unit 43 positively to the tube on which it is mounted rather than rely on the frictional contact provided by grub screws 54. In this case an additional bore is provided in the tube unit 43 slightly offset from the grub screws 54. Each additional bore contain a tight fitting spring pin aligned perpendicular to the local inner bore of the tube unit. Once the unit has been located on the tube the spring pins are struck on their outer ends to cause them to be driven into and through the wall of the tube to lock the tube unit in position. As described earlier a cover C can then be used either to obscure the end of the pin to provide a secret fixing or to with a suitable aperture in the cover to provide a movable anchorage for the pin.

In an alternative version of this coupling the cover C shrouding end 52 is replaced by an end closure in the form of a welded disc coaxial with axis 47. This provides for a coupling serving as an end for a tube length. However such an end closure can take any of a variety of forms both decorative and/or functional and include means such as eyes, sockets and couplings to enable other elements to be connected into the system.

Figure 6:
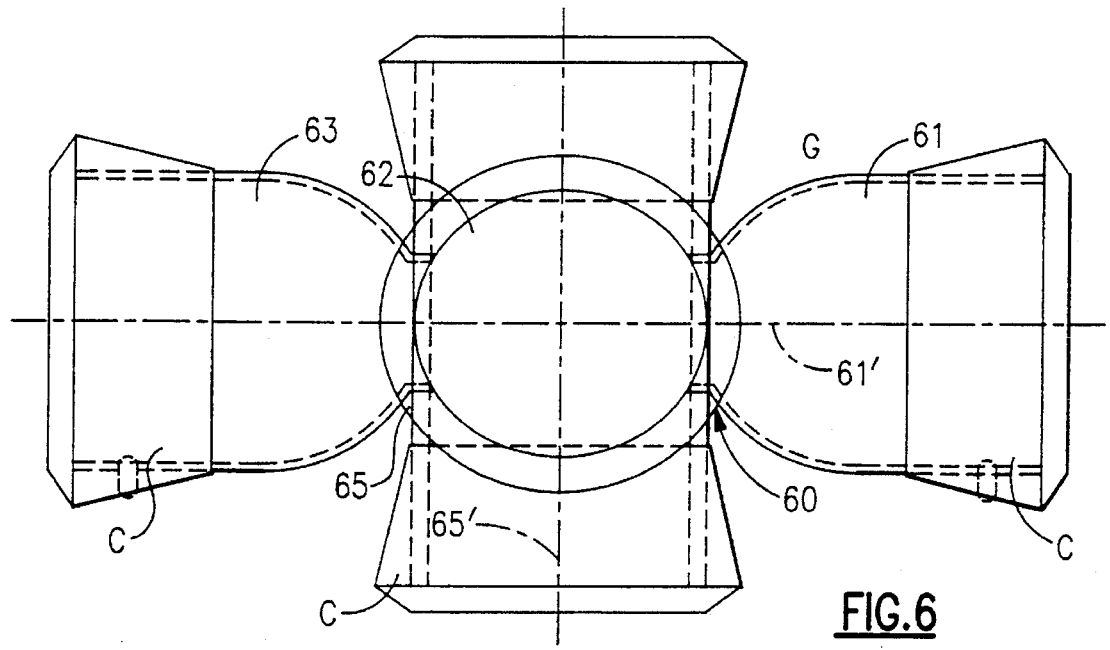
FIG. 6 is a side view.
Figure 7:
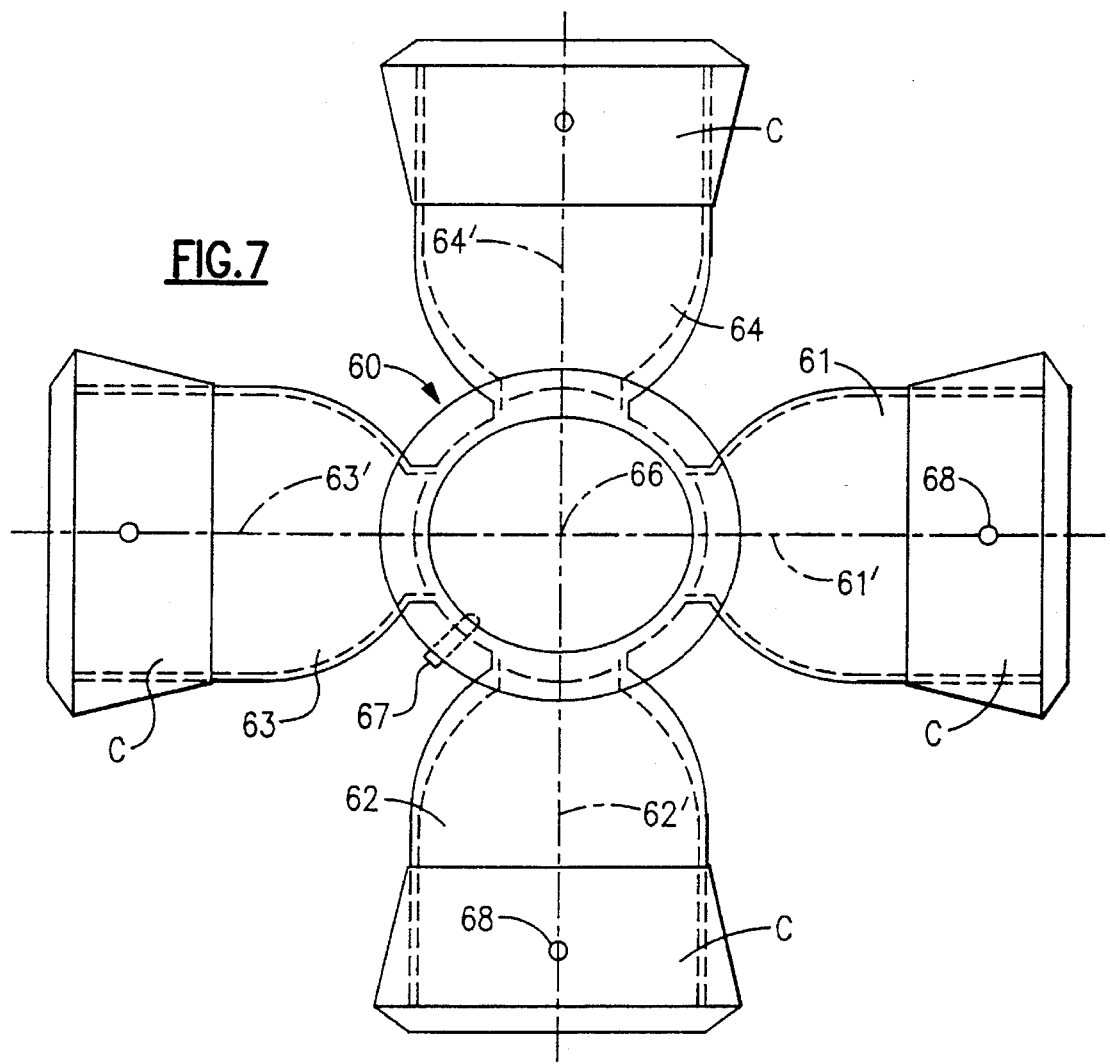
FIG. 7 is a plan view of a third embodiment.

FIGS. 6 and 7

This shows a coupling 60 having four cups 61, 62, 63, 64 (with, respectively, longitudinal axis 61', 62', 63' 64') welded to a tube unit 65 with its longitudinal axis 65'. The axes 61', 62', 63', 64' lie in the same plane so that adjacent axis are at right angles to one another. The axis all intersect at point 66 on the axis 65'. The unit 60 is secured to a tube extending through it by way of a pair of grub screws 67. Similar grub screws 68 are provided on each of the cups 61 to 64 to function as described earlier.

As before the open .end of each cup 61–64 and the open ends of the unit 60 are each shrouded by a cover C. As before in the case of the covers shrouding each cup the cover serves to retain the grub screw 68.

Figure 8:
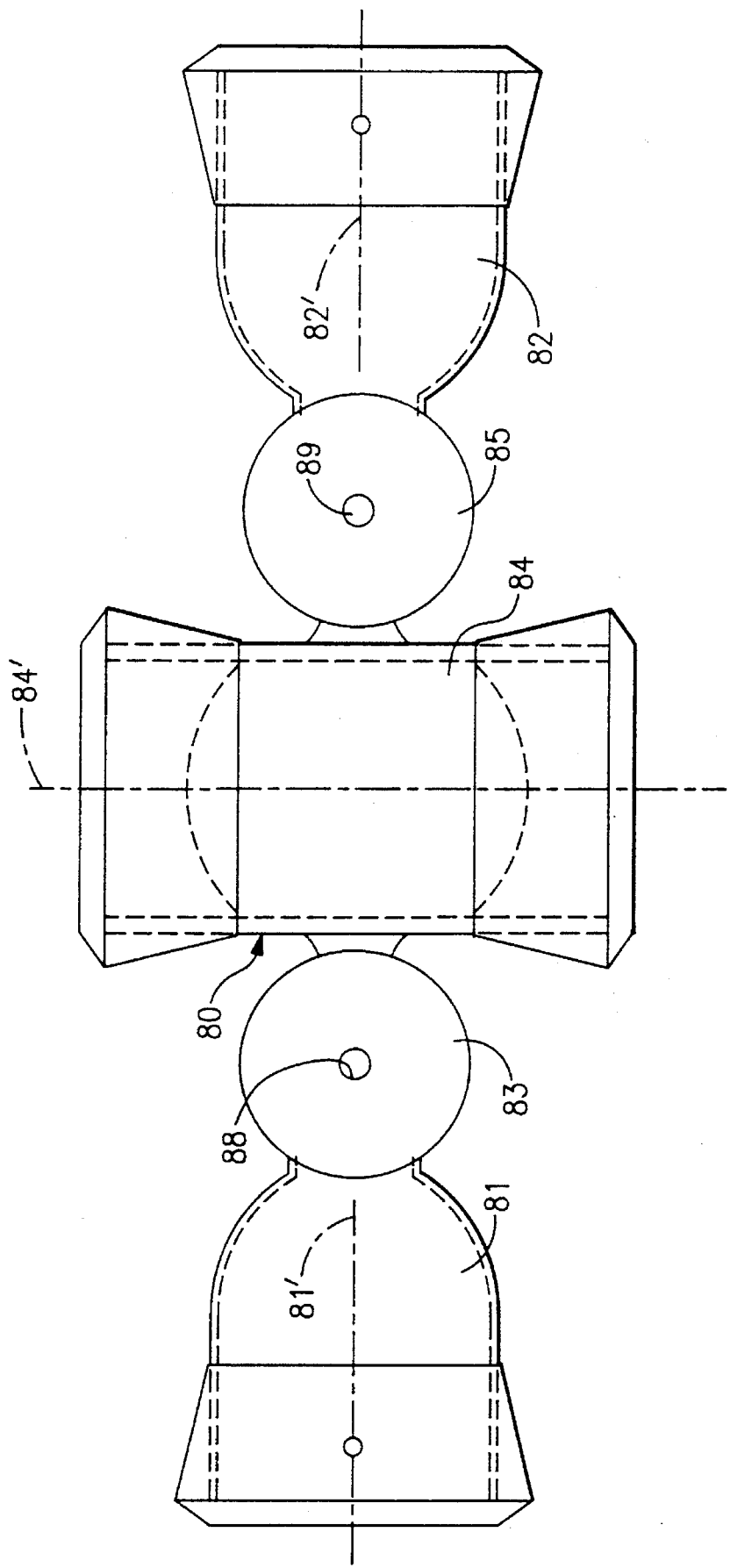
FIG. 8 is a side view.
Figure 9:
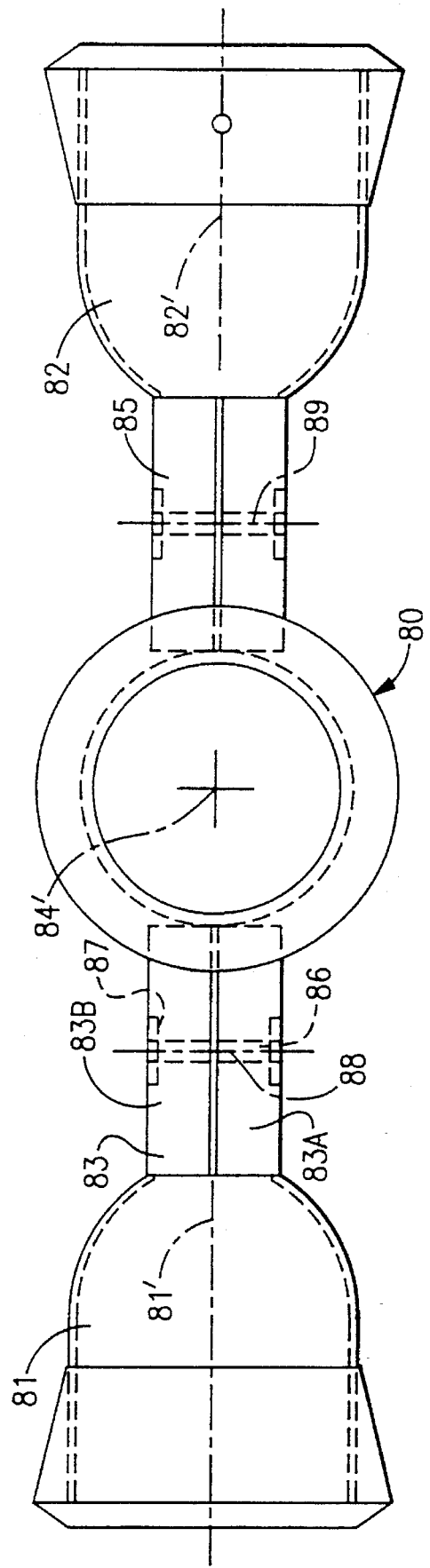
FIG. 9 is a plan view of a fourth embodiment.

FIGS. 8 and 9

This shows a coupling providing for the connection of tubular elements at selected angles. Coupling 80 comprises cup-shaped units 81,82 having, respectively, longitudinal axes 81', 82'. Cup-shaped unit 81 is coupled by block 83 to a tube unit 84 having a longitudinal axis 84'. Cup-shaped unit 82 is coupled by block 85 to tube unit 84. As unit 82 and block 85 are similar in form and function to unit 81 and block 83 only the latter will now be described in detail.

Block 83 is in two parts, part 83A and part 83B. Part 83A is welded to cup 81 and part 83B to tube unit 84. The parts 83A and 83B are coupled to one another by way of bolt 86 and nut 87 to enable the part 83B, and so cup 81, to pivot about axis 88. In a like manner cup 82 can pivot about axis 89 of block 85.

In this case the blocks are disposed on the tube unit 84 so that axes 88, 89 while being parallel to one another are perpendicular to axis 84'. In an alternative version of the coupling blocks corresponding to blocks 83, 85 are located with axes corresponding to axes 88, 89 set parallel to one another and to axis of their associated tube unit corresponding to axis 84'.

Figure 10:
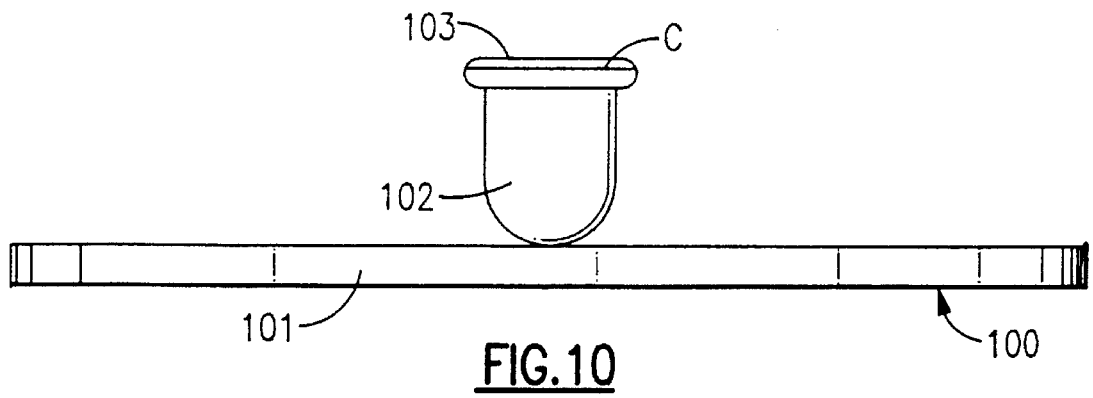
FIG. 10 is a side view.
Figure 11:
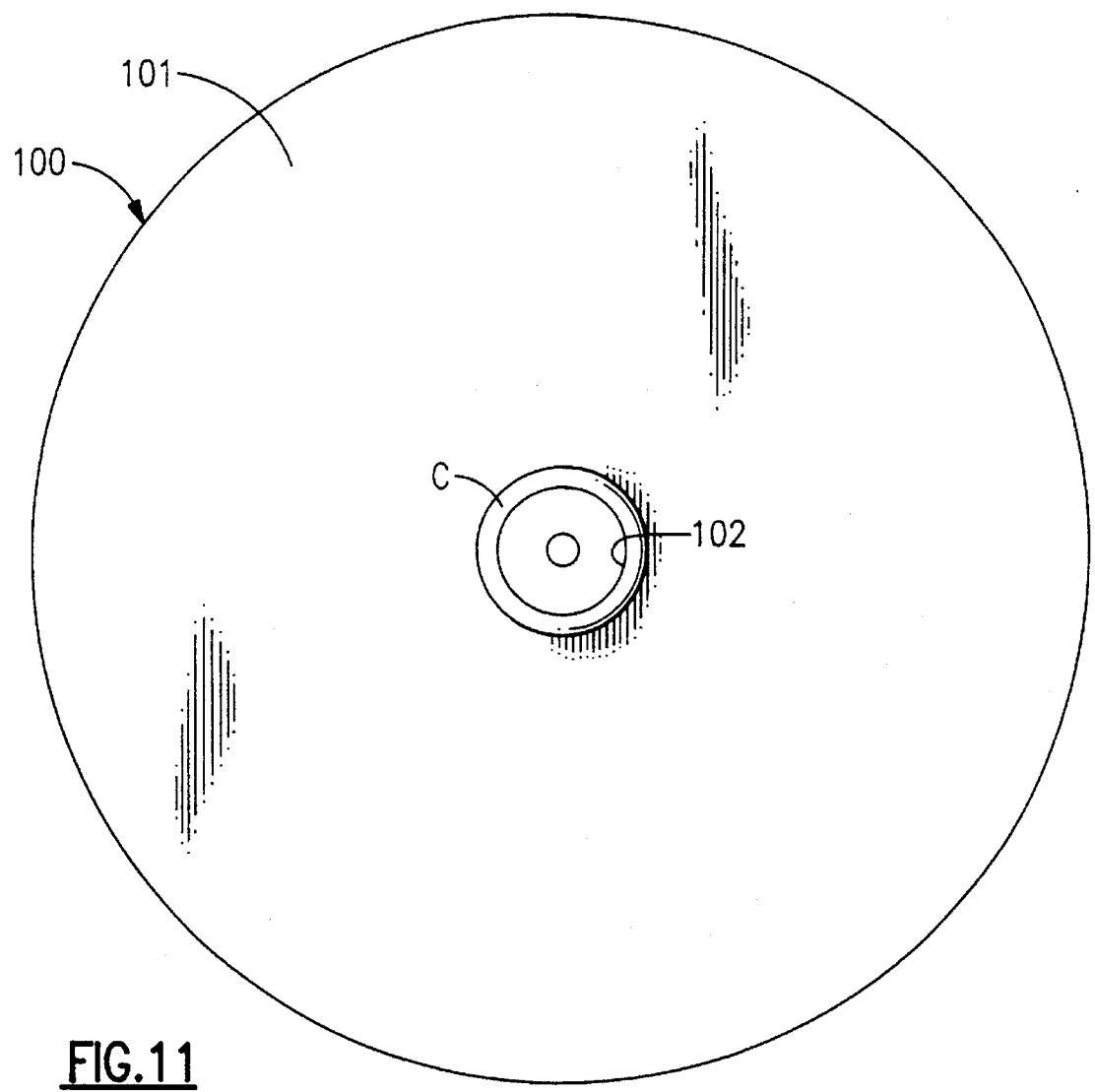
FIG. 11 is plan view of a base unit.

FIGS. 10 and 11

These show a base unit 100 for supporting a vertical tube to which other tubes can be coupled by means of the couplings described earlier and comparable units according to the present invention. The unit 100 is made up of a circular plate 101 for seating on a floor or other flat surface carrying a cup 102 corresponding in form and function to cup 14 of FIG. 1 and having on its open end 103 a cover C similar in form, material and function to those described earlier. The base unit 100 can incorporate more than one tube unit, or a cup-shaped or block unit as described earlier, to serve as a basis for a structure to be built on top of them.

Industrial Applicability

The particular embodiments described here are merely shown as examples of a wide range of possible couplings providing an extremely versatile assembly system whereby tubes can be coupled to one another to provide many different types of structure.

The modular construction system described is particularly intended for use in location where the visual appearance of any assembly is of particular importance. Typical uses would be for exhibition and display stands, for barriers or guides in shops, stores and banks, and for temporary use in buildings for purposes of decoration or building work where conventional scaffolding would be unacceptable for whatever reason.

FIG. 1 shows an aperture 13 which provides for the welding of the cup 14 to a block or tube unit. In the described unit the aperture of each cup unit would normally be closed by the part of the block or tube unit to which it is attached. However it is envisaged that part of the block or tube unit closing the aperture in a cup unit could be removed either before or after the step of joining the cup to the unit to enable electrical cabling or compressed air or fluid conduiting to be incorporated, and so concealed, in a structure comprising or incorporating the construction system so as to enable services to be readily provided where necessary. Typically by housing the cables and conduits in this way lighting, fans, display units, data linkages, telephones and water supplies can be readily supplied with intrusive cabling or conduits.

The exemplary embodiments are finished with a powder coating which provide an excellent surface finish. Other finishes can be used such as paint or various types of coating. The couplings can be used with tube which has either a contrasting finish, such as chromium or bright polished metal, to that of the couplings or can be finished with a similar coating to that of painted coupling with which they are to be used. In addition the covers can be of similar or contrasting colours and finishes to those of the couplings and/or the tubes. The couplings can also include advertising material such as logos, decorative motifs, names or assembly instructions or guides.

I claim:

1. A coupling for a modular construction system whereby a tubular element is linked to another element characterised by:

at least one cup-shaped unit (P, 22, 41, 61, 81, 102) of substantially uniform wall thickness having an open end (16) linked by an internal bore (17) of substantially uniform transverse dimension followed by a section of progressively reducing interior transverse dimension leading to a reduced end (12); the open end (16) serving to receive an end (E) of a tubular element (T) to enable the end (E) to be pushed along the internal bore (17) to a rest position (18) formed by the reducing interior transverse dimension, and locking means (30) enabling the end (E) of tubular element (T) to be, retained against further movement relative to the cup-shaped unit (P); the length (L') of the unit (P) being between one and one half and twice the outside diameter (D) of the tubular element (or of the major transverse dimension of the tubular element if it is of non-circular cross-section) to be retained by the cup-shaped unit; the reduced end (12) serving to form an aperture (13) at the reduced end (12) of the cup-shaped unit, said aperture (13) communicating with said internal bore (17) and providing a through bore in said cup-shaped unit (P), which aperture (13) is no more than one-half the maximum interior diameter (I) or maximum interior transverse dimension of the cup-shaped unit (P); and the or each cup-shaped unit (P, 22, 41, 61, 81, 102) being secured to either:
   (i) a tube unit (43) adapted to enable a tubular element (T') to extend at least part way through the tube unit (43); or
   (ii) a block unit (83) adapted to align longitudinal axis (81') of cup-shaped unit (81) with a corresponding axis (84', 82') of at least one other tube unit (80) or further cup-shaped unit (82).

2. A coupling as claimed in claim 1 characterised in that the locking means is a screw (30) adapted to be driven into frictional engagement with the tube end (E) located in the cup-shaped unit (22, 41, 61, 81, 102).

3. A coupling as claimed in claim 1 characterised by having a block unit (24, 83), to which at least one cup-shaped unit (23, 81) is coupled, connected to a further cup-shaped unit (22) or to a tube unit (84) by way of a pivot (27, 88) to enable angular alignment of the longitudinal axis (26, 81') of the cup-shaped unit (23, 81) to be varied relative to and secured in any one of at least two positions relative to the further cup-shaped unit (22, 82) or tube unit (84).

4. A coupling as claimed in claim 1 characterised in that the open end of the or each cup-shaped unit (22) is shrouded by a skirt (C) of flexible material serving to conceal any visual anomaly arising between the open end 16 and a tubular member (T) inserted in the open end.

5. A coupling as claimed in claim 4 characterised in that the skirt (C) further serves to retain and/or conceal the locking means (30).

6. A method of manufacturing a coupling as claimed in claim 1 characterised in that the or each cup-shaped unit (P) is fabricated by:

providing a section of pipe of substantially uniform wall thickness having an interior diameter (I), or major interior dimension, slightly larger than an outer diameter (D), or the major outside dimension, of a tubular element (T) to be used with the system;

deforming one end of the section so that while leaving a major part of an interior bore (17) of substantially uniform transverse dimension there is provided a progressively reducing interior transverse dimension providing a cup-shaped end (12) for interior bore (17), said cup-shaped end (12) forming an aperture (13), said aperture (13) communicating with said interior bore (17) and providing a through bore in said section of pipe such that:

(i) the inner diameter (I), or major interior dimension, of the pipe length at or near the cup-shaped end (12) is less than that of an outer diameter (D) of a tubular element (T) so as to limit travel of tubular element (T) into the deformed pipe length;

(ii) the deformed section has a length (L') being between one and one half and twice the interior diameter (I) or major interior dimension; and (iii) the deformed section serves to define an aperture (13) at the cup-shaped end (12) which aperture is no more than one-half the inside diameter (I) of the undeformed section;

mounting a tubular element retaining means (30, FIG. 3) on the cup-shaped unit (P); and securing the section by means of the apertured end (12) to the tube unit (43) or the block unit (24).

7. A method as claimed in claim 6 characterised by two cup-shaped units (22, 23) assembled by:

securing the one end of one cup-shaped unit (22) to a first part (24A) of a block unit;

securing the one end of the other cup-shaped unit (23) to a second part (24B) of a block unit; and linking the first part of the block unit (24A) to the second (24B) so that the longitudinal axis (25, 26) of each cup-shaped unit (22, 23), extended if necessary, intersects with alignment axis (27) at substantially the same point.

8. A method as claimed in claim 7 characterised in that the step of linking the first (24A) and second (24B) parts of a block unit (24) is by way of a pivot (27) so that the longitudinal axis (25) of one cup-shaped unit (23) can be displaced about the alignment axis (27) relative to the other cup-shaped unit (22) and then be clamped with a selected angular displacement between the longitudinal axes (25, 26).

9. A method as claimed in claim 6 characterised in that the step of securing the one end of each cup-shaped unit (P) includes an initial operation of profiling the deformed end (12) of each cup-shaped unit so that the profile complements the region of the tube unit (43 FIG. 3) or block unit (24 FIG. 2) to which it is to be attached; and a joining operation involving a welding or material deposition or displacement which operation is undertaken from within the cup-shaped member (P) by way of the aperture (13) so as to limit the ejection of displaced material to an external region of the coupling adjacent juxtaposed regions of the cup-shaped member (12) and the tube unit (43) or block unit (34).

10. A structure assembled by way of a coupling as claimed in claim 1.

* * * * *